Jan. 21, 1941. W. E. BURNS 2,229,275
KEY FOR CANS
Filed July 15, 1939
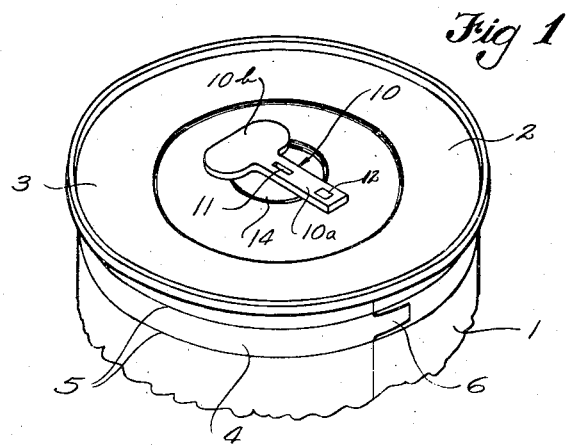
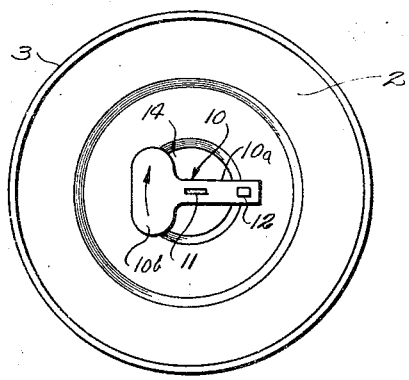
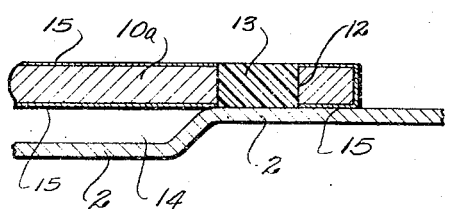
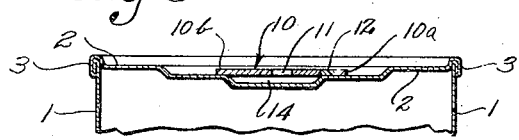
INVENTOR
WILFORD E. BURNS.
BY
Cook & Robinson
ATTORNEY Patented Jan. 21, 1941

2,229,275

UNITED STATES PATENT OFFICE 2,229,275

KEY FOR CANS

Wilford E. Burns, Burlingame, Calif., assignor to M. J. B. Company, San Francisco, Calif., a corporation of Delaware Application July 15, 1939, Serial No. 284,661

1 Claim. (Cl. 220—52)

This invention relates to keys for cans of the key opened, tearing strip types, and it has reference more particularly to the formation and treatment of the keys preparatory to their attachment to a can wall, and to a novel method of attaching them to the can walls in order that they will be retained against dissociation from the can, or loss, prior to the time for putting them to their intended use.

It is the principal object of this invention to provide an improved type of key and a novel method of attaching it by means of a solder bond, to the can end wall; also, to so form the solder bond that the key will be securely held in place prior to time of use, and without danger of being detached due to strain on or crystallization of the bond and may be easily and readily removed by shearing the solder bond when use of the key is desired.

It is a further object of this invention to provide keys, and a method of attaching them, that will insure uniformity of the connecting bonds with reference to the effort or pull that is required for disconnection or detachment of keys from the cans.

Still another object of this invention is to provide a key, and method of attaching it to a can, that will result in a saving in the usual amount of solder used in the attachment of keys, as well as in the expense for material from which the keys are made.

It is a still further object of the invention to provide a key that is initially given a protective coating of lacquer, or an equivalent coating material, of a character adapted to protect the key against rust or tarnish, and to which coating solder will not adhere, and to form the key, after such a coating has been applied thereto, with a solder receiving hole, punched therethrough to expose the bare metal of the key for direct fusion thereto of the solder over a limited and definite area, which is determined by the size of the hole.

Still further objects of the invention reside in the details of construction of the key, and in the details of the solder bond whereby it is attached to the can end and in the article embodied by the associated key and can end.

In accomplishing these and other objects of the invention, I have provided the improved details of construction, the preferred forms of which are illustrated in the accompanying drawing, wherein—

Fig. 1 is a perspective view of the upper end portion of a can, with a key, embodying the present invention, attached to the end wall thereof.

Fig. 2 is a top view of the can, showing the disposition of the key relative to a central depression in the can end wall.

Fig. 3 is a sectional view, taken on the line 3—3 in Fig. 2.

Fig. 4 is an enlarged sectional detail of the end portion of the key that is attached to the can end wall and the attaching solder bond.

The present type of key is intended for use in the opening of cans of the tearing strip types, and the size, weight of metal, position or extent of the tongue receiving slot may vary in accordance with the particular make of can with which it is to be used.

Referring more in detail to the drawing—

1 designates what may be the body portion of a metal can of the usual type, and 2 designates the can end wall, also of metal. As here shown, the end is attached to the body by the usual double seam 3.

Formed in the can body, is a tearing strip 4, defined by the two spaced lines of scoring 5 and 5, that encircle the can body near its upper end; the tearing strip terminating in an exposed tongue 6, as is the usual practice when it is to be removed by means of a key.

Reference numeral 10 designates, in its entirety, the present key that is provided as the means for removing the tearing strip from the can body. In its present preferred design, the key is formed, or struck, from a piece of flat sheet metal, and comprises the key shank 10a extending from a flat, enlarged handle portion 10b.

Formed in the shank, at a medial point, and longitudinally thereof, is a slot 11 designed in use of the key to receive the tongue 6 of the tearing strip and near its end, the shank has an unround opening 12, such as triangular hexagonal, square or oblong for reception of the solder, which forms the key attaching bond 13.

As will be noted by reference to Fig. 2, the can end 2 is formed centrally with a slight depression 14 across which the key is laid for attachment, as noted in Fig. 2, and it will be understood by reference to Fig. 3 that the end portion of the key shank somewhat overlaps the flat surface of the can end wall just outside the depression, as does also the handle portion, to give the key a substantial bearing when laid flatly upon the can end. The depression affords an easier hold on the key for its removal, as it is not required that it be pried up by means of the finger nails.

It will here be mentioned, as explanatory matter, that the attaching of keys by use of a solder bond is quite old in the art. The patent of Hermani, No. 1,922,916 issued on August 15, 1933, shows the attachment of a key by the formation of a solder rivet in a hole that is provided in the key shank, and which rivet is fused to the can end. Also, in the patent of Prahl et al., No. 1,907,364, is shown the attachment of a solder tipped key. In each of these disclosures, there is no effective way provided for limiting the spread of solder along the key shank and it is a fact that there may be a very material difference in the holding effect of the solder on different cans because of the difference in spread or run of solder along the key shank, and not because of any variation in the amounts of solder used.

The present invention has taken this objectionable and noticeable variation in holding effect of the solder into consideration and has devised means in the formation and coating of the key and the method of attaching it to insure uniformity. This is accomplished as follows: After the key, with slot 11, has been blanked out, it is given a coating of lacquer, or of any other equivalent. Preferably, the coating is over the entire surface of the key, but at least over that part of the key shank that is intended to receive the solder. In the sectional detail of the key, shown in Fig. 4, the coating, to which solder will not adhere or fuse, is designated by reference numeral 15. Then the hole 12 for the solder bond 13 is punched through the key shank. This punching operation leaves the bare metal of the side walls of the hole exposed and uncoated. Then the key is applied flatly to the can end wall, as in Fig. 3, and the solder to form the bond 13 is applied within the hole, preferably by means of hot iron, and is caused to fuse to the can end wall and to the exposed metal of the key within the punched hole 12. This solder bond, as shown at 13 in Fig. 3, fills the hole 12 and the amount of solder used is such as to cause the bond to come flush with the top surface of the key. However, it could overrun and form a head, but this is not especially needed or desired.

One of the advantages in so applying the solder is that it may be applied at a relatively low temperature and thus will not crystallize and have the liability of breaking loose during treatment of the can such as in cooking, etc.

The gist of the invention resides in the fact that, by reason of coating the key with a material to which solder will not adhere, and subsequently punching the hole to receive the solder bond, a very definite area of bare metal will be exposed, and this will be substantially equal in all keys. In this way, the holding connection on the key is limited to the bare area within the punched hole to which the solder will be fused, and regardless of spread of solder beneath the key, or along the shank, there will be no holding connection incident thereto because of the fact that the key coating prevents the solder adhering thereto.

To detach the key, it is only necessary to press the handle portion laterally, or in a radial direction, as designated by the direction of the arrow in Fig. 2, to shear off the solder bond and free the key. This shearing action is the result of making the key hole 12 unround, since, by reason of this shape, the key cannot rotate on the solder bond, but will operate to shear or break it loose from the can. This result is not insured by use of a round hole.

Keys of this kind are relatively inexpensive because they may be punched from sheet metal that is ordinarily waste. The coating operation is an inexpensive operation and the attaching of the key requires less solder than is usually employed in attaching solder tipped keys.

Having thus described my invention, what I claim as new therein and desire to secure by Letters Patent is—

The method of attaching keys to cans which comprises coating the key with a lacquer or the like to which solder will not adhere, punching a hole through the coated key to leave bare metal exposed within the hole, applying the key against the can wall and applying molten solder within the hole to form a connecting bond between the key and can wall which is fused to the metal of the key within the said punched hole.

WILFORD E. BURNS.